Patented Aug. 21, 1934

1,970,695

UNITED STATES PATENT OFFICE 1,970,695

PROCESS FOR MANUFACTURE OF HYDROGEN AND CATALYST USED IN SUCH PROCESS

George H. Freyermuth, Elizabeth, N. J., assignor to Standard Oil Development Company, a corporation of Delaware No Drawing. Application December 23, 1929, Serial No. 416,218

8 Claims. (Cl. 23—212)

The present invention relates to the manufacture of hydrogen from hydrocarbons by the action of steam at elevated temperature. My invention will be fully understood from the following description of the method and the manufacture and nature of my improved catalytic materials.

In the manufacture of hydrogen by the reaction of hydrocarbons, such as methane or higher members of that series with steam at elevated temperatures, it is generally the practice to use catalytic masses containing nickel or cobalt with or without addition of other materials. These catalysts are active over a considerable range from 300° or 350° to 1000° C. or higher, but I have found that their chief difficulty is a marked tendency to shrink under the temperatures used. This undesirable property in the catalyst causes the gases to channel through the catalyst tubes and in consequence part of the gas does not have sufficient contact with the catalyst and passes unconverted. The operator then slightly raises the temperature in an effort to obtain better conversions and causes still more rapid shrinkage. The net result is that the catalyst tubes must be continually repacked and the operation frequently interrupted.

I have found that certain catalytic masses have a high resistance to shrinkage and although considerably more rugged, they appear to be equally as sensitive as those previously known. By use of my catalysts the process is capable of operation for almost indefinite periods without repacking the catalyst.

In manufacturing my catalyst, I add to a solution of a nickel or cobalt salt, such as nitrate, oxalate or chloride or the like, a material known to commerce as alundum cement and which is used widely in the refractory art as a lute for mufflers and a cement for fire brick and the like. This material has the following approximate composition:

| | Per cent |
|---|---|
| CaO | 5 |
| SiO$_2$ | 5 |
| Al$_2$O$_3$ | 90 |

Part or the whole of the Al$_2$O$_3$ may be in the form of insoluble alumino-silicates, if desired, and it should be understood that such material can be admixed to make a synthetic alundum cement in which it is desirable to have at least 2% of CaO or an oxide of a similar alkaline earth oxide or rare earth oxide such as thorium or zirconium oxide. The alumina and insoluble silicates are preferably fused or at least heated to a high temperature, say 2500° F. or higher and then powdered. The alumina should be in excess of the silica. As an example of the manner in which catalyst may be prepared the following description is given. About 16.5 pounds of black nickel oxide (Ni$_2$O$_3$) in powdered form is mixed with about 25.2 pounds of alundum cement, which is also finely ground. About two quarts of water is then added and should be thoroughly mixed or incorporated so as to form a stiff paste in about 10 minutes and this is preferably done in aluminum vessels. The paste is then spread in a layer ½ to ¼ inch in thickness and cut into cubes with a spatula or other suitable means. The catalyst is dried for about 24 hours above 250° F. It is preferable to heat to a sintering temperature of about 1800° F. which may be satisfactorily carried out in an atmosphere of hydrogen. It will be understood that cobalt salts or oxide are equivalent to those of nickel.

The catalyst is packed into tubes and under use at temperatures from 800 to 1500° F. or higher shows little or no shrinkage for many weeks. It is structurally or mechanically very strong and is very resistant to mechanical handling as well as loss of activity.

I am aware that kaolin and other aluminous materials have been suggested as an ingredient of catalysts for this purpose, but heretofore to my knowledge only unfused materials have been used, which results in great shrinkage under use as stated above.

My invention is not to be limited to any theory of the mechanism of my process or catalytic agent nor to any examples given merely for illustrative purposes, but only by the following claims in which I wish to claim all novelty inherent in the invention.

I claim:

1. An improved process for producing hydrogen, comprising passing a mixture of hydrocarbons and steam at an elevated temperature over a catalyst comprising nickel and a fused alumino silicate.

2. Process according to claim 1, in which a strongly basic element is also included.

3. Process according to claim 1, in which the alumina is in substantial excess of the silica.

4. Process according to claim 1, in which a small quantity of an alkali earth oxide is included.

5. An improved process for production of hydrogen which comprises passing a mixture of hydrocarbon vapor and steam at a temperature of 800° F. to 1800° F. over a catalytic mass prepared by mixing a powdered fused alumino-silicate containing excess alumina and a small amount of an earth oxide with water and powdered nickel oxide to form a thick paste, then drying and sintering the material.

6. An improved process for the production of hydrogen by reaction of hydrocarbons and steam which comprises passing a mixture of hydrocarbon vapor and steam at a suitable reaction temperature over a catalytic mass comprising a mixture of nickel with a powdered fused aluminosilicate containing excess alumina and a small amount of an earth oxide.

7. Process according to claim 6 in which the reaction temperature is 1200 to 1800° F.

8. Process according to claim 6 in which the catalyst mass is heated to about 1800° F. before use as a catalyst in the said reaction.

GEORGE H. FREYERMUTH.